Patented May 12, 1936

2,040,794

UNITED STATES PATENT OFFICE 2,040,794

COMMON-COLD ANTIGEN

Horace M. Powell, Indianapolis, Ind., assignor to Eli Lilly and Company, Indianapolis, Ind., a corporation of Indiana No Drawing. Application October 24, 1934, Serial No. 749,815

10 Claims. (Cl. 167—78)

My invention is concerned with prophylaxis against the common cold, and it is my object to produce an immunizing antigen which, in man, will create a substantial degree of active immunity to that disease. A further object of my invention is to produce such an immunizing antigen which will be effective when administered orally.

Many investigators including Kruse, Foster, and Dochez and his collaborators, and I also (Proc. Soc. Exper. Biol. and Med., 1931, 29, 332–335) believe that while the ordinary common cold may originally be caused by a mildly acting filtrable virus the prolongation and the more serious and disagreeable effects of the disease result from infection with bacteria, in most cases Pneumococci, influenza Bacilli, and/or Streptococci, arranged in order of decreasing importance. I have demonstrated the beneficial result of the treatment with heterophile antibodies of Pneumococcus infections in experimental animals (Amer. Jour. Hyg. 1933, 17, 102–121); and since influenza Bacilli and Streptococci resemble Pneumococci in that many of their strains contain more or less heterophile antigen, it has occurred to me that if the common cold in its bacterial stages is in large part due to infections with Pneumococci, influenza Bacilli, or Streptococci its incidence could be decreased and its more serious consequences prevented by broad active immunization against heterophile antigen.

I have found long ago that the production of heterophile antibodies can be caused with practically no negative phase by orally administered heterophile antigen, if the heterophile antigen is in a form such that its antigenic properties are not destroyed or unduly masked by bile or other secretions of the digestive tract (Amer. Jour. Hyg. 1925, 5, 228–229 and Proc. Ind. Acad. of Sci. 1925, 34, 261–263).

I have now developed an immunizing antigen which can be administered orally, and which will produce heterophile antibodies in sufficient quantities to increase very materially the resistance of individuals to the common cold.

I prefer to employ micro-organisms usually associated with the common cold and especially the pneumococcus as the source of heterophile antigen used in my product, although other sources of heterophile antigen may be utilized. The particular strains of micro-organisms or other sources of heterophile antigen used should be selected with regard to two characteristics—namely, their heterophile antigen content and their ability to resist the effects of the digestive juices, especially bile. Since the usual virulent strains of Pneumococci are susceptible to lysis by bile, a process causing destruction of heterophile antigen, strains in the rough form are desirable. For best results, the strains used also should be capable upon parenteral administration of inciting a heterophile antibody titre of not less than 10,000 units per cubic centimeter in experimental rabbits. (The "unit" herein referred to is that described in Amer. Jour. Hyg. 1933, 17, 102–111.) Any other micro-organism rich in heterophile antigen and naturally resistant to, or rendered artificially resistant to, the destructive action of bile may effectively be used in producing my oral immunizing antigen.

As an example a suitable strain of Pneumococcus is selected and planted in a beef infusion broth, preferably a broth enriched with sheep red blood cells, such media being derived from the tissues of edible animals and of itself containing heterophile antigen supplied by the sheep red blood cells, and grown for 24 hours at body temperature. The culture is then centrifuged to separate the organisms which are harvested in isotonic saline solution and killed with heat or a germicide. The suspension is then centrifuged to the consistency of a paste and tested for sterility and bacterial count by the usual methods.

This product is capable, upon oral administration, of inciting the production of heterophile antibodies in man. As a paste or heavy emulsion, however, it is not well suited to distribution or oral administration, and I therefore prefer to convert it into another form. To this end, the heavy bacterial emulsion is mixed with starch or other inert substance to which it may conveniently be adsorbed. This mixture consists of approximately one part of bacterial emulsion and 25 to 100 parts of the inert material. The mixture is then dried rapidly at a temperature of about 37° C. and ground to a powder. An alternative method, although one less preferable, is to first dry the bacterial emulsion and then mix with starch or other inert material. In either case the mixture is conveniently made in such proportions that in the final dried perparation 100 billion Pneumococci are contained in the amount of material which will fill a number 4 capsule. In using organisms other than Pneumococci, the mixtures of organisms and inert adsorbing material is varied according to the heterophile antigen content of the organism used.

The drying of the material should not be too thorough. I prefer drying at 37° C. to constant weight, as I have found that the material can be dried, as by subjecting it to temperatures in the neighborhood of 100° C., to a point such that it remains refractory to moisture in the digestive tract, thus interfering with its assimilation. I find that adsorbing the bacterial emulsion on inert material prior to drying tends to prevent it from reaching too desiccated a condition.

In conferring and maintaining immunity, the size and frequency of the doses given may vary considerably as in the well known method of parenteral immunization, but I have found a satisfactory procedure consists of the oral administration of one capsule daily for one week and then one or two capsules weekly throughout the season during which colds are prevalent.

The immunity produced by the product above described is not specific to the particular organism or strain of organisms used in the preparation of the antigen, but instead extends with considerable effectiveness to other organisms as well. This absence of specificity indicates that the production of immunity is not dependent upon the species source of the antigen and that sources of heterophile antigen other than Pneumococci might be expected to be suitable. I have found this to be the case, and have produced an antigen capable of effecting immunity to the common cold by applying the process above described to selected strains of hemolytic Streptococci and hemorrhagic-septicemia Bacilli. I prefer to employ Pneumococci, however, as they are in general more bile-resistant than other suitable organisms and at the same time more effective in stimulating the production of heterophile antibodies.

Extensive clinical tests in over 500 cases, with slightly more than this number of controls in the same age group and under the same hygienic conditions establish that the incidence of colds among persons treated as above set forth is reduced by 40 to 50%, and that such colds as experienced by treated individuals are, on the average, materially less severe and of less duration than those experienced prior to treatment, or those experienced in the same respiratory season by untreated control subjects. Further, administration of the preparation creates no negative phase, the treated individuals showing no greater susceptibility to colds immediately following treatment than at any other time.

I claim as my invention:

1. A preparation for immunization against the common cold and suitable for oral administration to humans, comprising killed bile-resistant Pneumococci of a rough strain and of high heterophile-antigen content adsorbed on starch.

2. A preparation for immunization against the common cold and suitable for oral administration to humans, comprising killed bile-resistant Pneumococci of a rough strain and of high heterophile-antigen content.

3. A preparation as set forth in claim 2 with the addition that the Pneumococci used are of a strain having the property of stimulating a heterophile antibody titre of 10,000 units per cubic centimeter in rabbits when administered parenterally.

4. A preparation for immunization against the common cold and suitable for oral administration to humans, comprising killed micro-organisms of a kind associated with upper respiratory infections in man, said micro-organisms being bile-resistant and of high heterophile-antigen content.

5. A preparation for immunization against the common cold and suitable for oral administration to humans, comprising killed micro-organisms of the class consisting of Pneumococci, Streptococci, influenza Bacilli, and hemorrhagic-septicemia Bacilli, said micro-organisms being bile-resistant and of high heterophile-antigen content.

6. The invention set forth in claim 4 with the addition that said micro-organisms are adsorbed on starch.

7. The invention set forth in claim 5 with the addition that said micro-organisms are adsorbed on starch.

8. A preparation for immunization against the common cold and suitable for oral administration to humans, comprising killed bile-resistant Pneumococci of a rough strain having the property of stimulating a heterophile antibody titre of 10,000 units per cubic centimeter in rabbits when administered parenterally.

9. A preparation for immunization against the common cold and suitable for oral administration to humans, comprising killed micro-organisms of a kind associated with upper respiratory infections in man, said micro-organisms being bile-resistant and capable of stimulating a heterophile antibody titre of 10,000 units per cubic centimeter in rabbits when administered parenterally.

10. A preparation for immunization against the common cold and suitable for oral administration to humans, comprising killed micro-organisms of the class consisting of Pneumococci, Streptococci, influenza Bacilli, and hemorrhagic-septicemia Bacilli, said micro-organisms being bile-resistant and capable of stimulating a heterophile antibody titre of 10,000 units per cubic centimeter in rabbits when administered parenterally.

HORACE M. POWELL.